US011563527B2

(12) United States Patent
Kim et al.

(10) Patent No.: US 11,563,527 B2
(45) Date of Patent: Jan. 24, 2023

(54) METHOD AND DEVICE FOR EFFICIENT HARQ OPERATION

(71) Applicant: Samsung Electronics Co., Ltd., Suwon-si (KR)

(72) Inventors: Sangmin Kim, Yongin-si (KR); Bongjin Kim, Suwon-si (KR); Cheolhee Lee, Yongin-si (KR); Kilsik Ha, Anyang-si (KR); Jaewon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 203 days.

(21) Appl. No.: 16/626,787

(22) PCT Filed: Dec. 15, 2017

(86) PCT No.: PCT/KR2017/014849
§ 371 (c)(1),
(2) Date: Dec. 26, 2019

(87) PCT Pub. No.: WO2019/004536
PCT Pub. Date: Jan. 3, 2019

(65) Prior Publication Data
US 2020/0119854 A1   Apr. 16, 2020

(30) Foreign Application Priority Data

Jun. 26, 2017   (KR) .................. 10-2017-0080630

(51) Int. Cl.
*H04L 1/18* (2006.01)
*H04W 84/04* (2009.01)

(52) U.S. Cl.
CPC ......... *H04L 1/1812* (2013.01); *H04W 84/042* (2013.01)

(58) Field of Classification Search
CPC ... H04L 1/1812; H04L 1/1845; H04L 1/1864; H04L 1/1819; H04L 1/0047; H04L 1/1874; H04L 1/0057; H04L 1/18; H04W 84/042
See application file for complete search history.

(56) References Cited

U.S. PATENT DOCUMENTS 6,700,867 B2 * 3/2004 Classon ................ H04L 1/1845
370/216
8,402,333 B2 * 3/2013 Kim ...................... H04L 1/1812
714/748
(Continued)

FOREIGN PATENT DOCUMENTS

WO   2016/021957 A1   2/2016
WO   2017/016606 A1   2/2017
WO   2017/039738 A1   3/2017

OTHER PUBLICATIONS

European Search Report dated Jun. 5, 2020, issued in European Application No. 17915848.0.

*Primary Examiner* — Hanh N Nguyen
(74) *Attorney, Agent, or Firm* — Jefferson IP Law, LLP

(57) ABSTRACT

The present disclosure is research (No. GK17N0100, Millimeter-wave 5G Mobile Communication System Development) having been performed with support from "The Cross-Ministry Giga KOREA Project" funded by the government (Ministry of Science and ICT) in 2017. Disclosed are: a communication technique for merging, with IoT technology, a 5G communication system for intelligent services (for example, smart home, smart building, smart city, smart car or connected car, healthcare, digital education, retail, security, and safety related services, and the like) on the basis of 5G communication technology and IoT-related technology. According to the present invention, a method by which a transmitter transmits data comprises a (Continued)

step of transmitting a data packet to a receiver, receiving hybrid ARQ (HARQ) feedback information based on a decoded result of the data packet, generating a data packet to be re-transmitted on the basis of the HARQ feedback information, and transmitting, to the receiver, the data packet to be re-transmitted, wherein the HARQ feedback information can include acknowledgment (ACK) or negative-acknowledgment (NACK) and information including a HARQ status of the data packet.

12 Claims, 10 Drawing Sheets

(56) References Cited

U.S. PATENT DOCUMENTS

| | | |
|---|---|---|
| 2003/0118031 A1 | 6/2003 | Classon et al. |
| 2009/0249150 A1 | 10/2009 | Grovlen |
| 2009/0313516 A1 | 12/2009 | Shin et al. |
| 2012/0198308 A1* | 8/2012 | Varnica ............. H03M 13/3707 714/760 |
| 2015/0124728 A1 | 5/2015 | Bergstrom et al. |
| 2017/0126363 A1 | 5/2017 | Wang et al. |
| 2017/0207895 A1 | 7/2017 | Yang et al. |
| 2018/0255611 A1 | 9/2018 | Li et al. |

* cited by examiner

METHOD AND DEVICE FOR EFFICIENT HARQ OPERATION

TECHNICAL FIELD

The disclosure relates to the fifth generation (5G) wireless communication. In particular, the disclosure relates to a method and a device for an efficient HARQ operation.

BACKGROUND ART

To meet the increasing demand for wireless data traffic since the deployment of 4G communication systems, efforts have been made to develop an improved 5G or pre-5G communication system. Therefore, the 5G or pre-5G communication system is also called a "beyond 4G network" communication system or a "post LTE System." Implementation of the 5G communication system in ultrahigh frequency (mmWave) bands, e.g., 60 GHz bands, is being considered in order to accomplish higher data rates. To mitigate a path loss of the radio waves and increase the transmission distance on the radio waves in the ultrahigh frequency bands, beamforming, massive multiple-input multiple-output (massive MIMO), full dimensional MIMO (FD-MIMO), array antenna, analog beamforming, and large scale antenna techniques are being discussed for 5G communication systems. In addition, in 5G communication systems, development for system network improvement is under way based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like. In addition, in the 5G system, hybrid FSK and QAM modulation (FQAM) and sliding window superposition coding (SWSC), as advanced coding modulation (ACM) systems, and filter bank multi carrier (FBMC), non-orthogonal multiple access (NOMA), and sparse code multiple access (SCMA), as advanced access technologies, have been developed.

On the other hand, the Internet, which is a human centered connectivity network where humans generate and consume information, is now evolving to the Internet of things (IoT) where distributed entities, such as things, exchange and process information without human intervention. The Internet of everything (IoE), which is a combination of IoT technology and big data processing technology through connection with a cloud server, has emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently researched. Such an IoT environment may provide intelligent Internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by beamforming, MIMO, and array antennas, which correspond to 5G communication technology. Application of a cloud radio access network (cloud RAN) as the above-described big data processing technology may also be considered to be an example of convergence between the 5G technology and the IoT technology.

With the development of communication technology, an HARQ technology to perform an errorless transmission has become important. In this case, there is a need to efficiently perform an HARQ process using a limited HARQ buffer.

The disclosure is directed to the research (No. GK17N0100, Millimeter-Wave 5G Mobile Communication System Development) having been performed with support from "The Cross-Ministry Giga KOREA Project" funded by the government (Ministry of Science and ICT) in 2017.

DISCLOSURE OF INVENTION

Technical Problem

The disclosure is to propose a method and a device capable of improving an error correction capability of a receiver using a limited HARQ buffer and performing an HARQ process at low cost and with low power consumption.

Solution to Problem

According to embodiments of the disclosure to solve the above-described problem, a method by a transmitter for transmitting data includes transmitting a data packet to a receiver; receiving hybrid ARQ (HARQ) feedback information based on a decoding result of the data packet; generating a data packet to be retransmitted based on the HARQ feedback information; and transmitting the data packet to be retransmitted to the receiver, wherein the HARQ feedback information includes an acknowledgment (ACK) or a negative-acknowledgment (NACK) and information indicating an HARQ status of the data packet.

According to embodiments of the disclosure, a method by a receiver for receiving data includes receiving a data packet from a transmitter; generating hybrid ARQ (HARQ) feedback information based on a decoding result of the data packet; transmitting the HARQ feedback information to the transmitter; and receiving a retransmitted data packet generated based on the HARQ feedback information from the transmitter, wherein the HARQ feedback information includes an acknowledgment (ACK) or a negative-acknowledgment (NACK) and information indicating an HARQ status of the data packet.

According to embodiments of the disclosure, a transmitter for transmitting data includes a transceiver configured to transmit and receive signals with a receiver; and a controller configured to: control the transceiver to transmit a data packet to the receiver and to receive hybrid ARQ (HARQ) feedback information based on a decoding result of the data packet, generate a data packet to be retransmitted based on the HARQ feedback information, and control the transceiver to transmit the data packet to be retransmitted to the receiver, wherein the HARQ feedback information includes an acknowledgment (ACK) or a negative-acknowledgment (NACK) and information indicating an HARQ status of the data packet.

According to embodiments of the disclosure, a receiver for receiving data includes a transceiver configured to transmit and receive signals with a transmitter; and a controller configured to: control the transceiver to receive a data packet from the transmitter, generate hybrid ARQ (HARQ) feedback information based on a decoding result of the data packet, and control the transceiver to transmit the HARQ feedback information to the transmitter and to receive a retransmitted data packet generated based on the HARQ feedback information from the transmitter, wherein the HARQ feedback information includes an acknowledgment (ACK) or a negative-acknowledgment (NACK) and information indicating an HARQ status of the data packet.

Advantageous Effects of Invention

According to the various embodiments of the disclosure, the HARQ process can be efficiently performed at low cost and with low power consumption through an efficient usage of the limited HARQ buffer, and thus the throughput of the communication system can be increased.

MODE FOR THE INVENTION

Figure 1:
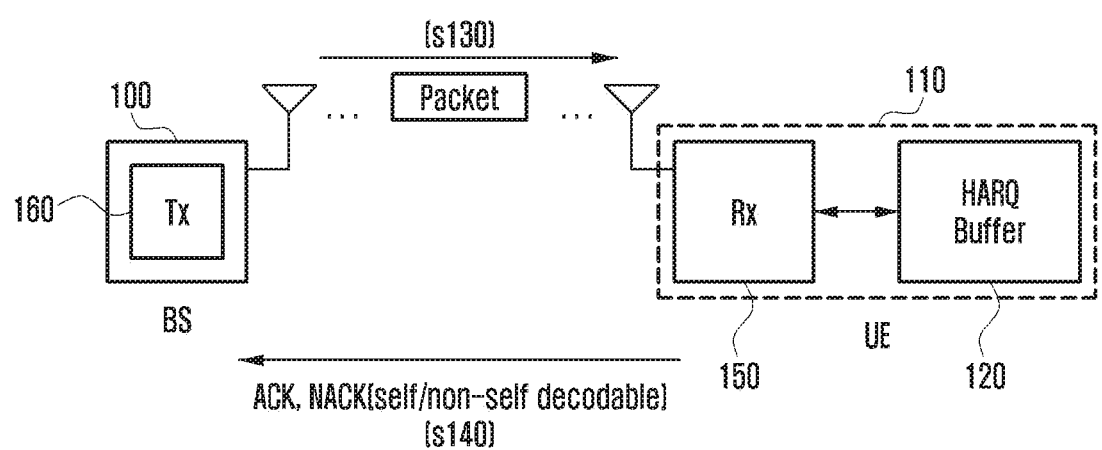
FIG. 1 is a diagram illustrating an example in which feedback information is transmitted between a transmitter and a receiver according to the disclosure.

Hereinafter, embodiments of the disclosure will be described in detail with reference to the accompanying drawings. In describing the disclosure, detailed explanation of related well-known functions or configurations incorporated herein will be omitted in the case where it is determined that they obscure the subject matter of the disclosure in unnecessary detail. Further, terms to be described later are terms defined in consideration of their functions in the disclosure, but they may differ depending on intentions of a user and an operator or customs. Accordingly, they should be defined based on the contents of the whole description of the disclosure.

In describing the embodiments of the disclosure in detail, the primary subject matter of the disclosure can be applied to other systems having similar technical backgrounds through slight modifications within a range that does not greatly deviate from the scope of the disclosure, and this will be possible by the judgment of those of skilled in the art to which the disclosure pertains.

The aspects and features of the disclosure and methods for achieving the aspects and features will be apparent by referring to the embodiments to be described in detail with reference to the accompanying drawings. However, the disclosure is not limited to the embodiments disclosed hereinafter, and it can be implemented in diverse forms. The matters defined in the description, such as the detailed construction and elements, are only specific details provided to assist those of ordinary skill in the art in a comprehensive understanding of the disclosure, and the disclosure is only defined within the scope of the appended claims. In the entire description of the disclosure, the same drawing reference numerals are used for the same elements across various figures.

In this case, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In this case, the term "~unit", as used in an embodiment, means, but is not limited to, a software or hardware component, such as FPGA or ASIC, which performs certain tasks. However, "~unit" is not meant to be limited to software or hardware. The term "~unit" may advantageously be configured to reside on the addressable storage medium and configured to execute on one or more processors. Thus, "~unit" may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "~units" may be combined into fewer components and "~units" or further separated into additional components and "~units". Further, the components and "~units" may be implemented to operate one or more CPUs in a device or a security multimedia card.

According to the hybrid automatic repeat request (HARQ) technology in the related art, retransmission has been performed in the unit of a data packet. In this case, a receiver stores a channel log-likelihood ratio (LLR) value in the unit of a packet of which decoding has failed, receives data retransmission, and combines the LLR value of the received packet with a stored LLR value to send the combined value as an input of a channel decoder. In this case, because a massive buffer is required to store one data packet as a whole, a technology to use a code block buffer that stores code blocks constituting the data packet in addition to the HARQ buffer has been proposed in order for the receiver that uses the HARQ technology to reduce the size of the massive buffer required to store the data packet. In the case of using the code block buffer, it is possible to reduce the buffer size required in the decoding process of the retransmitted data packet. Here, the code block buffer may store a resultant value (in this case, the resultant value may be expressed as hard decision bits) in the unit of a code block of which the decoding has succeeded.

In this case, a signal (in this case, the signal may be soft decision bits) in the unit of a plurality of code blocks received by the receiver is stored in the HARQ buffer, and at the same time, the code blocks of which the decoding has succeeded in the unit of a code block are stored in the code block buffer in accordance with the resultant value of the channel decoder (e.g., turbo decoder, or low-density parity-check (LDPC) decoder). If an error occurs in the data packet (the data packet is data in the unit of a transport block or sub-frame) including one or more code blocks, the receiver requests retransmission in the unit of a data packet from a transmitter, and the receiver combines the code block value, of which the decoding has failed, previously stored in the HARQ buffer with the value of the corresponding code block in the data packet retransmitted from the transmitter. Further, the receiver may call the resultant values of the code blocks of which the decoding has been succeeded from the code block buffer.

The above-described method that uses the code block buffer in addition to the HARQ buffer has a problem. First, because it is required that the size of the HARQ buffer is maximally a data packet or is about in the unit of a transmit block composed of a plurality of code blocks in the case where the error occurs in the plurality of code blocks, the function as the code block buffer proposed in the related art is gone, and the size of the HARQ buffer is increased to a size required to store a plurality of data packets or transmit blocks in the case where the error occurs in the plurality of code blocks. Second, the receiver additionally requires management of the code block buffer to control an input or output of the code block buffer for performing an operation, such as successive transmission of the code blocks to a higher layer, with respect to the code blocks of which the decoding has failed and the code blocks of which the decoding has succeeded. Third, because information about the degree of decoding failure of the HARQ buffer of the receiver or a terminal (it may be interchangeably used with user equipment or mobile station) and whether the HARQ data can be stored is not fed back to the transmitter or base station (it may be interchangeably used with eNB, gNB, or network), there is a possibility of inefficient HARQ transmission and reception as a whole. Accordingly, the HARQ method based on the code block buffer having the above-described problem may be unsuitable to the next-generation communication system receiver (e.g., portable terminal) that requires low cost and low power consumption.

In the disclosure, the following method and device are proposed to achieve improvement of error correction capability of the data packet (or transmit block) of the receiver, low cost, and low power consumption.

First, in order to overcome the drawback in the related art that the size of the HARQ buffer is increased in the case where the error occurs in the plurality of code blocks, the disclosure proposes a method for efficiently using a limited buffer size. The disclosure provides a method and a device for performing HARQ transmission and reception at low cost and with low power consumption as the result of reducing the number of times of error occurrence even with maintenance of the minimum HARQ buffer size using statistical distributions of the data packets or the code blocks of which the error has occurred. For this, the disclosure provides a function in which the receiver performs feedback sot that the transmitter can select the HARQ type (specifically, HARQ chase combining (hereinafter, CC), HARQ partial incremental redundancy (IR), or HARQ full IR) during the data transmission in accordance with the increase or decrease of the number of errors in the unit of code blocks during the retransmission. Because the feedback information of the receiver, being provided to the transmitter, is information reflecting the decoder performance and the HARQ buffer capacity performance of the receiver, the transmitter selects an efficient transmission method in accordance with the performance status of the receiver based on the feedback information.

In the disclosure, the receiver provides necessary information when the receiver requests retransmission from the transmitter. During the retransmission request, the receiver transmits the feedback information to the transmitter based on whether the number of code block errors is increased or decreased, the number of early stopping occurrences in the decoding process in the unit of code blocks, and/or whether it is possible to store LLR values in the unit of code blocks or data packets (or transmit blocks) of which the decoding has failed. The transmitter may select the transmission type required for the retransmission based on the feedback information, and the feedback information may be determined by minimally one or various combinations of the above three kinds of criteria. Even if the limited HARQ buffer is used in accordance with the above-described method, the power and the buffer capacity required for the HARQ operation of the receiver can be reduced through the proposed method.

FIG. 1 is a diagram illustrating an example in which feedback information is transmitted between a transmitter and a receiver according to the disclosure. With reference to FIG. 1, a base station 100 (or transmitter) transmits a data packet to a terminal 110 (or receiver) using a transmitter 160 (s130). In accordance with the performance and operation statuses of an HARQ buffer and a receiver 150, the terminal may transmit, to the base station, information indicating whether a packet being retransmitted is self-decodable or non-self-decodable together with acknowledgment (ACK) or negative-acknowledgment (NACK) information on the packet being transmitted to the base station (s140). Based on the feedback information, the base station may finally select the HARQ type (e.g., CC, partial IR, or full IR) and it may retransmit the data packet. At least one of the following criteria should be considered to determine whether the packet retransmitted to the receiver is self-decodable or non-self-decodable. The above-described criteria are, first, whether the number of code block errors is increased or decreased in accordance with the increase of the number of times of retransmission, second, the number of early stopping occurrences in the decoding process in the unit of code blocks, and third, whether it is possible to store LLR values in the unit of code blocks or data packets (or transmit blocks), of which the decoding has failed, in the HARQ buffer.

Figure 2:
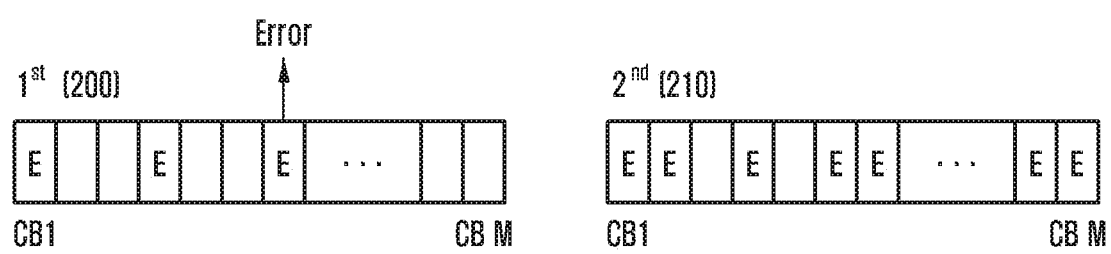
FIG. 2 is a diagram illustrating a case where an error of a code block is increased in accordance with an increase of the number of times of retransmission.

FIG. 2 is a diagram illustrating a case where an error of a code block is increased in accordance with an increase of the number of times of retransmission. With reference to FIG. 2, "200" denotes the decoding result of a packet during an initial transmission. In an initially transmitted packet, a code block of which an error has occurred as the result of decoding output is indicated as an error E. "210" denotes the result of decoding using data of the packet retransmitted due to the decoding failure of the initial transmitted packet and the initial transmitted packet. A code block of which an error has occurred as the result of decoding output is indicated as an error E. According to "210", it can be known that the number of code blocks of which the error has occurred is increased in comparison with that in the case of the initial transmission, and in this case, the receiver may transmit the feedback information to the transmitter through determination of the decoding performance in accordance with the inputs of the HARQ buffer and the receiver.

In FIG. 2, in the case of the next retransmission (after the retransmission), because there is a very high probability of decoding failure if the previously stored packet information is used, the receiver transmits the feedback information for transmission of the HARQ-decodable self-decodable data packet to the transmitter without the previous packet data, and thus the overall throughput performance can be improved.

As the criterion for determining whether the receiver receives the self-decodable or non-self-decodable packet in accordance with the decoding failure of the received packet, there is an early stopping criterion that is calculated in the decoding process in the unit of code blocks (this is the existing technology that is applied to the decoding using a turbo code or an LDPC code, and it means stopping of the decoding if there is a high possibility of decoding failure). In accordance with the number of satisfactions of the early stopping criterion, the receiver may predict the degree of error occurrence during decoding of the corresponding packet. The early stopping related information that is fed back to the transmitter may be applied to the transmission encoding to improve the system throughput, and it may finally raise the efficiency of the reception HARQ operation and the decoder decoding operation. Further, if carrier aggregation (CA) technology is applied to the transmitter and the receiver, the receiver variably allocates the HARQ buffer for each component carrier (CC) based on the number of CCs. In this case, the capacity of the HARQ buffer allocated for each CC may be insufficient depending on the degree of error occurrence in accordance with the channel. In this case, in accordance with the encoding method (e.g., encoding depending on whether the packet is self-decodable or non-self-decodable) during the packet transmission of the transmitter, the receiver can perform the optimized reception in accordance with the HARQ operation status of the receiver itself and the limited HARQ buffer capacity.

Specifically, if it is not possible to receive downlink control information (DCI) for scheduling a downlink data packet from the base station, the terminal is unable to store the LLR values of the corresponding data packet that is scheduled by the DCI in the HARQ buffer. In this case, the terminal may additionally transmit information indicating the above-described situation to the base station in addition to the NACK information to be used for the transmission encoding and the HARQ operation. In this case, the base station may retransmit the self-decodable data packet, and the terminal may receive and decode the data packet retransmitted by the base station.

Figure 3:
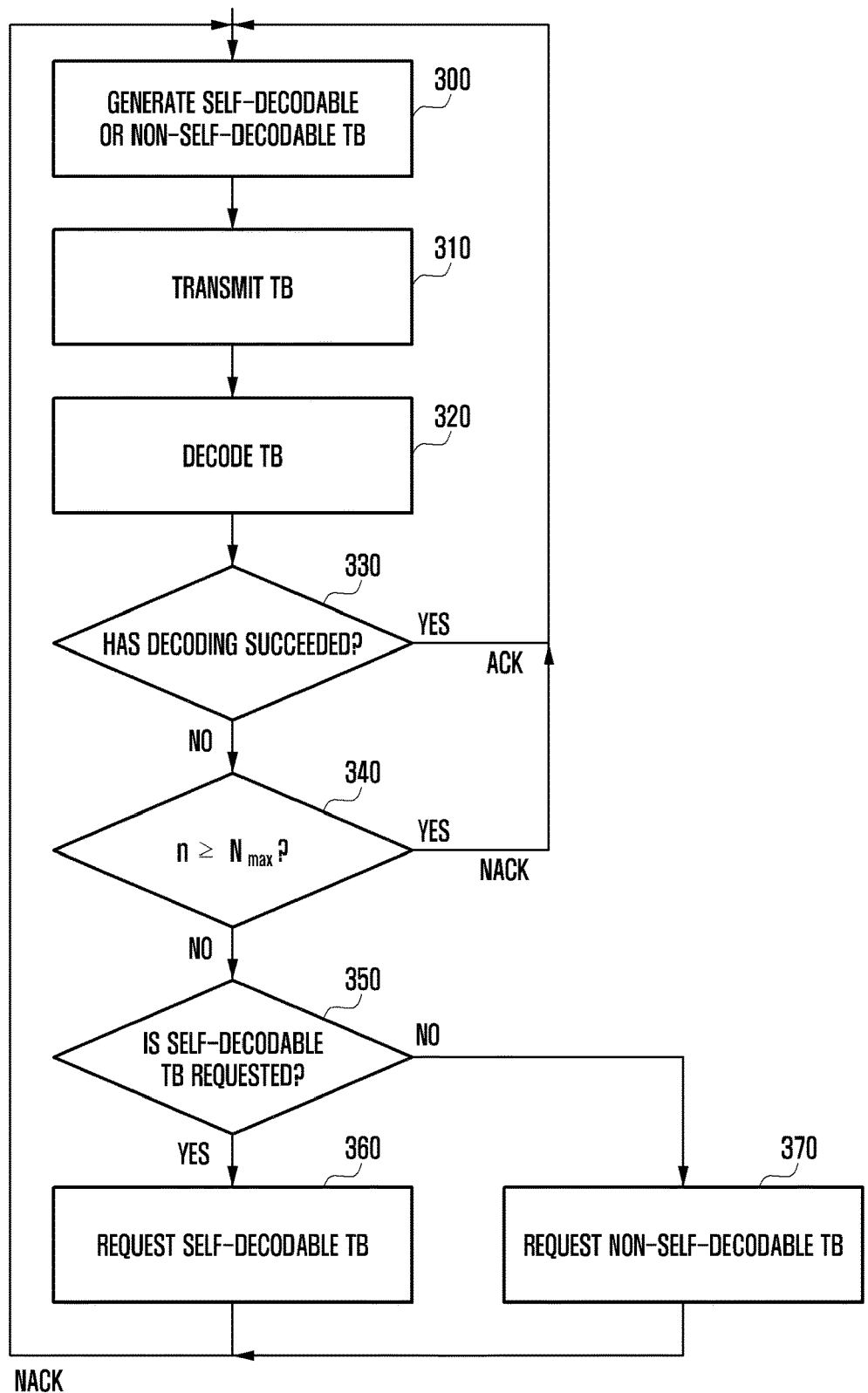
FIG. 3 is a diagram illustrating methods by a transmitter and a receiver for transmitting and receiving data.

FIG. 3 is a diagram illustrating methods by a transmitter and a receiver for transmitting and receiving data. Operations 300 and 310 correspond to a transmitter. At operation 300, the transmitter generates a transmit block (TB) through encoding of a data packet using a self-decodable or non-self-decodable code in accordance with an HARQ type being applied to the data packet intended to be transmitted by the transmitter, and at operation 310, the transmitter transmits the generated transmit block.

Operations 320 to 370 correspond to the receiver. After receiving the transmit block, the receiver, at operation 320, decodes the transmit block, and it determines whether the decoding in the unit of a transmit block (or packet) and in the unit of a code block (CB) has succeeded during the decoding process (330). If so, the receiver transmits ACK to the transmitter, whereas if not, the receiver determines whether the number n of transmissions is equal to or larger than the maximum number $N_{MAX}$ of transmissions (340). If so, the receiver transmits NACK to the transmitter, whereas if not, the receiver, at operation 350, determines whether to request the self-decodable transmit block or the non-self-decodable transmit block from the transmitter based on at least one of an error occurrence distribution being calculated in the decoding process of the transmit block having been received, whether to satisfy an early stopping criterion, the number of retransmissions of the current transmit block, or the resultant value of a cyclic redundancy check (CRC) of the transmit block. If it is intended to request the self-decodable transmit block, the receiver, at operation 360, requests the self-decodable transmit block from the transmitter together with the NACK, whereas if it is intended to request the non-self-decodable transmit block, the receiver, at operation 370, requests the non-self-decodable transmit block together with the NACK.

Further, at operation 360, the receiver may determine what transmit block is to be requested in accordance with the capacity of the HARQ buffer of the receiver itself and the decoder performance.

Hereinafter, the determination criterion at operation 360 and feedback information of the terminal will be described in more detail.

The receiver may transmit HARQ type related information required for the transmission to the transmitter in accordance with the number of error occurrences in the unit of a decoded data packet (or data packet being transmitted in the unit of a transmit block or a sub-frame), the number of early stopping occurrences during decoding, or whether it is possible to store the data packet of which the error has occurred in the HARQ buffer. As an example, the receiver may request the self-decodable transmit block if the ratio of the number of code blocks of which the error has occurred to the total number of code blocks in the data packet is equal to or larger than a specific threshold value, if the ratio of the number of code blocks of which the decoding has early stopped to the total number of code blocks in the data packet is equal to or larger than a specific threshold value, or if the data packet of which the error has occurred is not stored in the HARQ buffer. This is because the decoding performance may further deteriorate if the decoding is performed in combination with the data packet having large error, and there is no packet to be combined with during the decoding if the data packet is not stored in the HARQ buffer.

For this, the receiver may perform at least one of the following functions, or the receiver may include a configuration that can perform the above-described function. First, determination of increment/decrement of the number of errors of code blocks in accordance with the increase of the number of times of retransmission, second, determination of the number of early stopping occurrences in the decoding process in the unit of code blocks, and third, determination of whether it is possible to store the LLR values in the unit of code blocks or packets (e.g., transmit blocks), of which the decoding has failed, in the HARQ buffer.

The receiver may include information for determining the HARQ type in the NACK to be transmitted so that the transmitter can select the HARQ type (CC, partial IR, or full IR) based on the number of error occurrences of the packets received during an initial transmission and retransmission or whether the number of errors of code blocks is increased during the increase of the retransmission. Further, in the case of requesting the self-decodable packet among the feedback information that is sent by the receiver when the receiver transmits the NACK to the transmitter, the code rate of the packet may be indicated so that the code rate becomes variable.

Further, as a part of the feedback information that is transmitted to the transmitter, the receiver may transmit an HARQ quality indicator (e.g., good or bad) for transmitting an initial transmission of each data packet and the number of times of retransmission, a decoder of the corresponding receiver in accordance with the maximum number of times of possible retransmission, and/or the processing status of the HARQ buffer. Specifically, when the NACK is transmitted to the transmitter, the HARQ quality indicator may be transmitted as the feedback information of the receiver, and the HARQ quality indicator may have the minimum unit (good or bad quality may be indicated by 1 bit, and it may be expressed as 0,1 or 1,0) to the detailed unit ($1^{st}$ quality (best), $2^{nd}$ quality, to m-th quality (worst) may be expressed using a plurality of bits). In order for the transmitter to determine the HARQ quality based on the received HARQ quality indicator, it may be possible to apply pre-calculated threshold values to both the transmitter and the receiver in accordance with the modulation and coding scheme (MCS). The transmitter may select that the receiver performs a puncturing or repetition operation to change the code rate of the MCS or the corresponding data packet using the HARQ quality indicator fed back by the receiver before the number of times of retransmission reaches the maximum number of times of possible retransmission.

Further, if the terminal is unable to receive the DCI corresponding to one or more physical downlink shared channels (PDSCHs) when the base station schedules N PDSCHs, the terminal may additionally perform feedback of information indicating that it is necessary to retransmit the self-decodable data packet to the base station. For the feedback of the additional information, the terminal also performs feedback of an indicator (1 bit) for requesting transmission of a self-decodable data packet or a non-self-decodable data packet in addition to the ACK or NACK feedback information (1 bit). In this case, each request may be expressed by 0,1 or 1,0. The terminal may notify the base station whether the self-decodable retransmission is necessary using the added 1 bit, and if the terminal performs feedback of information indicating that the retransmission of the self-decodable data packet is necessary, the base station may perform the retransmission of the self-decodable data packet with respect to the data packet retransmission on all PDSCHs on which the NACK is determined among the N PDSCHs. The feedback information for requesting the self-decodable data packet may be included in uplink control information (UCI) that is transmitted on a physical uplink control channel (PUCCH), and each 1 bit for indicating whether to apply the component carrier, TDD, or FDD may be additionally configured.

Figure 4:
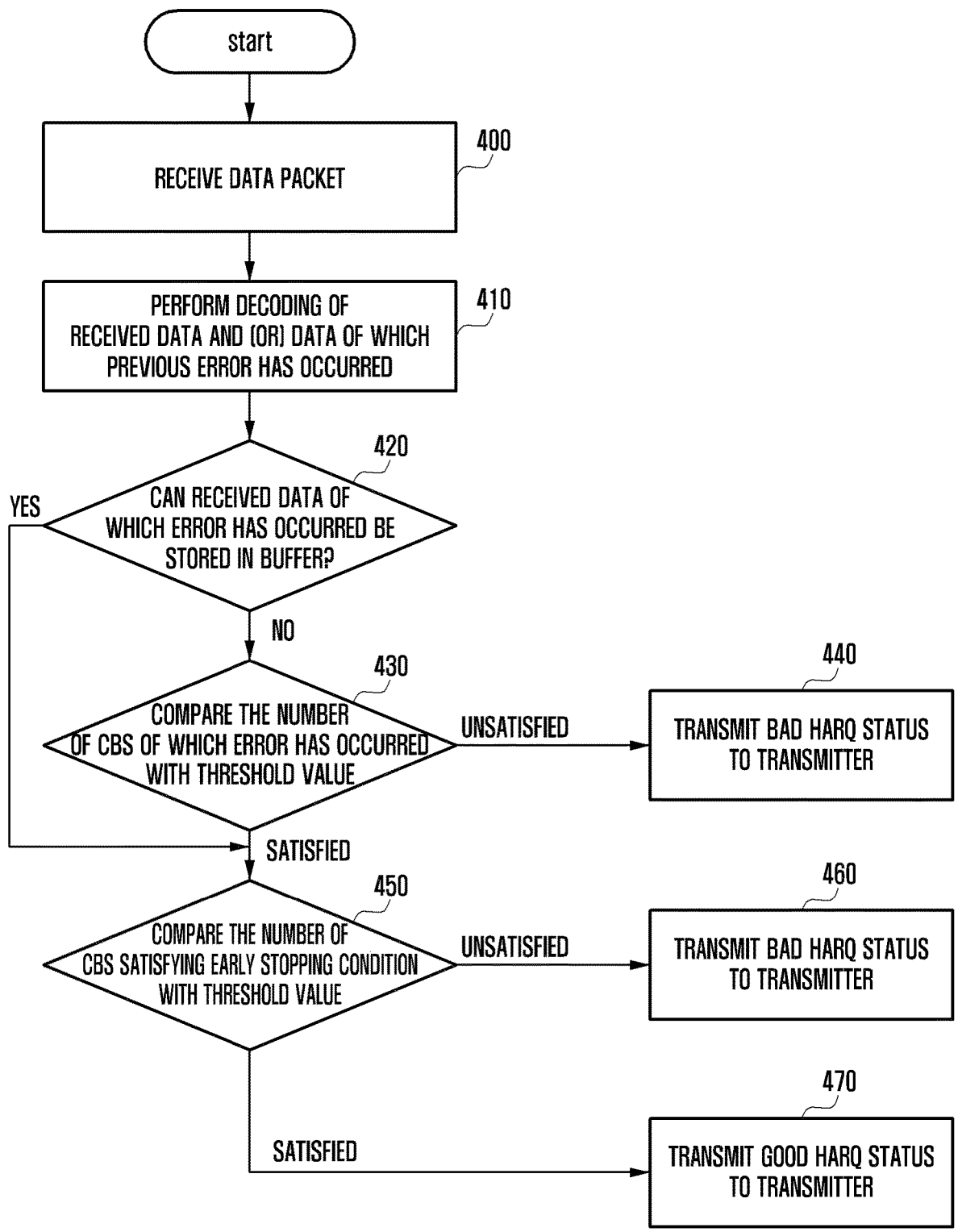
FIG. 4 is a diagram illustrating an example in which a receiver generates feedback information.

FIG. 4 is a diagram illustrating an example in which a receiver generates feedback information. FIG. 4 illustrates a method by a receiver for generating HARQ feedback information in accordance with an HARQ buffer operation and a decoder output status. The receiver receives a data packet (400), and performs decoding using LLR calculation for the received data packet and previously received data packet information (410).

Thereafter, the receiver determines whether it is possible to store the data packet in the HARQ buffer in the unit of transmit blocks or code blocks of which an error has occurred (420). If the storage is not possible, the receiver compares the number of error occurrences with a pre-calculated threshold value in the unit of the transmit blocks or code blocks (430), and if the number of error occurrences does not satisfy the specific threshold value (i.e., if the number of error occurrences is larger than the specific threshold value), the receiver performs feedback of a bad HARQ status to the transmitter (440). Further, if it is possible to store the data packet in the HARQ buffer at operation 420, or if the number of error occurrences satisfies the specific threshold value at operation 430, the receiver compares the number of transmit blocks or code blocks satisfying the early stopping condition with the specific threshold value (450), and if the number of transmit blocks or code blocks does not satisfy the threshold value (i.e., if the number of transmit blocks or code blocks satisfying the early stopping condition is larger than the specific threshold value), the receiver performs feedback of the bad HARQ status to the transmitter (460). At operation 450, if the number of transmit blocks or code blocks satisfies the threshold value (if the number of times of early stopping of the corresponding data packet (transmit blocks) or code blocks is small, and an error correction probability is increased during the decoding in combination with the next retransmitted data packet), the receiver performs feedback of a good HARQ status to the transmitter (470). At operations 430 and 450, the threshold value is determined in accordance with the number of code blocks constituting the MCS and the data packet (or transmit blocks) being applied to the data packet.

Figure 5:
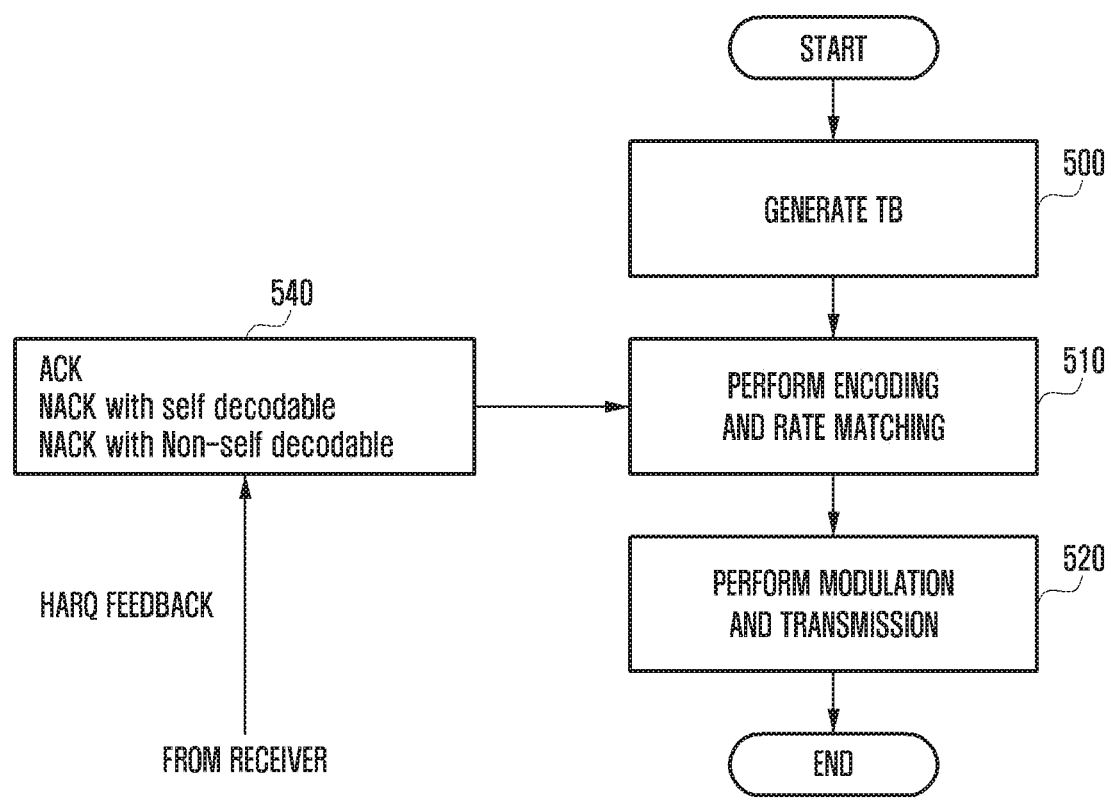
FIG. 5 is a diagram illustrating a method by a transmitter for transmitting a data packet based on received HARQ feedback information.

FIG. 5 is a diagram illustrating a method by a transmitter for transmitting a data packet based on received HARQ feedback information. The HARQ feedback information may be an indicator indicating transmission of ACK, NACK, and self-decodable data packet and an indicator indicating transmission of NACK and non-self-decodable data packet. The transmitter generates transmit blocks (500), and it performs encoding and rate matching using a self-decodable code or a non-self-decodable code among channel codes of the transmitter using the ACK, NACK, or an indicator 540 indicating whether the code is self-decodable or non-self-decodable, which are received from the receiver (510). In addition, as the feedback information that can be received by the transmitter at operation 540, a NACK without buffering data (in the case where the LLR value of which the error has occurred is unable to be stored in the HARQ buffer) may be included in accordance with the received HARQ buffer status. Thereafter, the transmitter demodulates the encoded transmit blocks and it transmits the demodulated transmit blocks (520).

Figure 6:
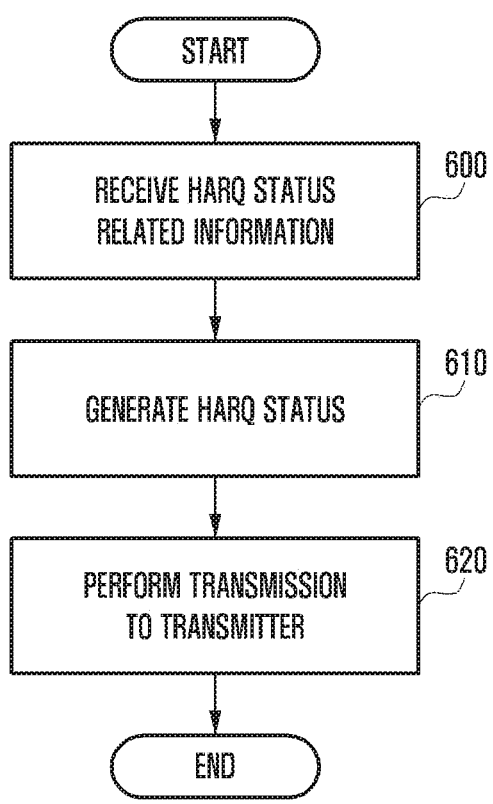
FIG. 6 is a diagram illustrating a method by a receiver for transmitting HARQ feedback information.

FIG. 6 is a diagram illustrating a method by a receiver for transmitting HARQ feedback information. A receiver receives HARQ related information from a transmitter (600). The HARQ related information is information required for the HARQ operation of the received data packet, and it may be information related to an initial transmission or retransmission, such as an HARQ process number or an MCS of the initial transmission or retransmission. In addition to generation of HARQ feedback information (610), the receiver may generate an indicator indicating transmission of a self-decodable code or a non-self-decodable code that is simply transmitted along with a NACK transmission. Further, if the receiver can generate feedback information of 2 bits or more, the receiver generates HARQ feedback information through comparison of the feedback information with a predetermined threshold value for each MCS in accordance with whether storage in an HARQ buffer is possible or the degree of error occurrence of the corresponding transmit block received by the receiver (e.g., the number of code blocks of which the error has occurred or the frequency of early stopping occurrences). In this case, the feedback information may be ACK, NACK and bad(n) HARQ, NACK and bad(n−1) HARQ, . . . and NACK and bad(1) HARQ. Here, n means a decoding status of a received transmit block (i.e., error level of a decoded transmit block). The receiver transmits the generated HARQ information to the transmitter (620).

Figure 7:
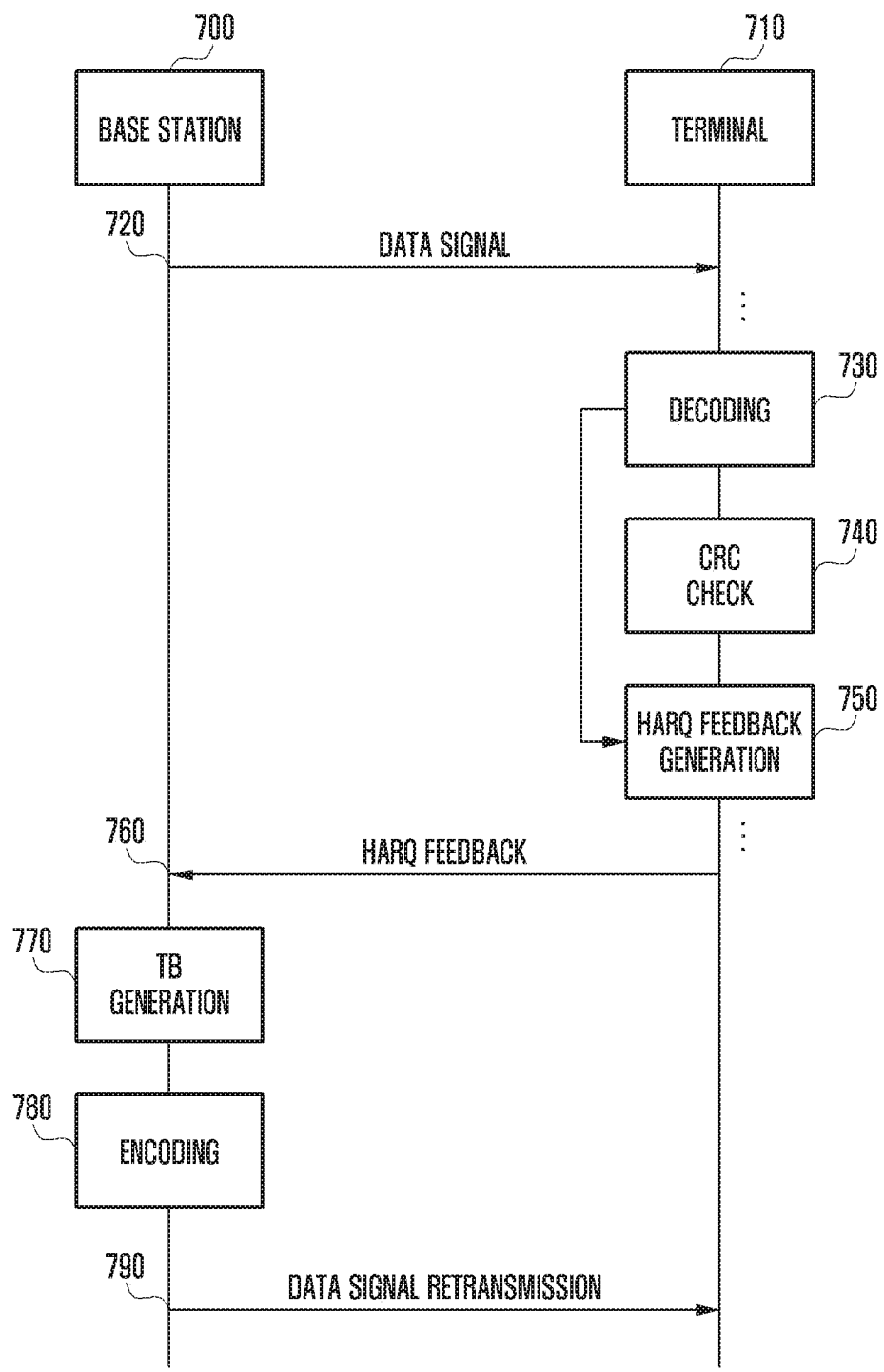
FIG. 7 is a diagram illustrating a process of performing the disclosure between a base station and a terminal.

FIG. 7 is a diagram illustrating a process of performing the disclosure between a base station and a terminal. With reference to FIG. 7, a base station 700 transmits a data signal to a terminal 710 (720). The terminal having received the data signal decodes the data signal (730), performs CRC check (740), updates the HARQ status based on the result of the decoding, and generates HARQ feedback information (750). The feedback information may be feedback information described in the disclosure. The terminal transmits the HARQ feedback information to the base station (760). The base station having received the HARQ feedback information generates transmit blocks (770), and it decodes the transmit blocks based on the feedback information (780). The base station retransmits the encoded transmit blocks (i.e., data signal) to the terminal (790).

Figure 8:
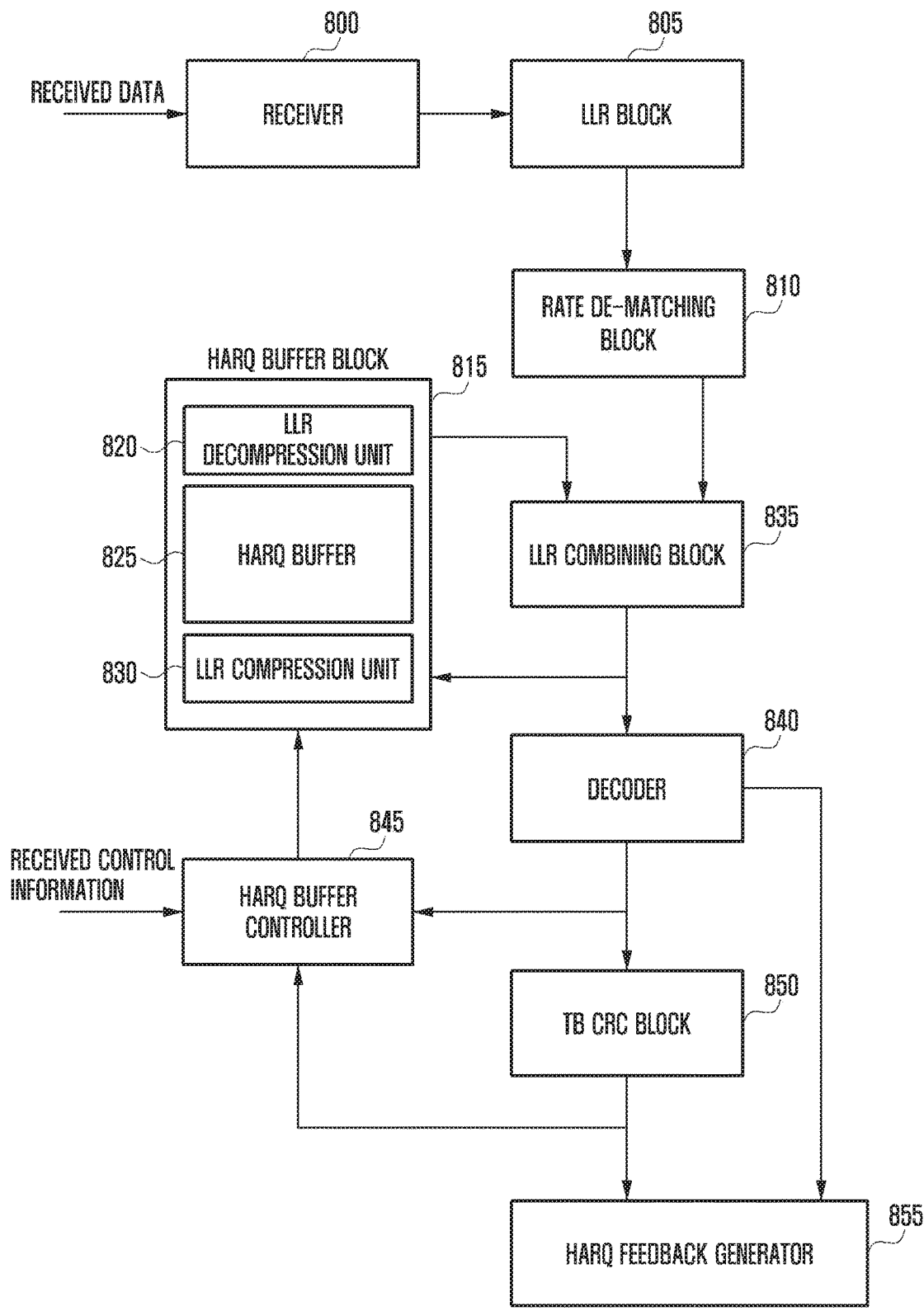
FIG. 8 is a diagram illustrating a receiver device capable of performing the disclosure.

FIG. 8 is a diagram illustrating a receiver device capable of performing the disclosure. With reference to FIG. 8, a receiver 800 inputs received data. The received data may be a data packet received on a data channel or data received from transmit blocks or a sub-frame. The received data is transmitted to an LLR block 805, and the LLR block calculates LLR values of the received data. The LLR block transmits the LLR values as an input of a rate de-matching block 810. At the same time, the receiver receives various control information (e.g., HARQ proves number (or identifier) and information related to initial transmission or retransmission) required for the HARQ operation of the data packet on a control channel. The information required for the HARQ operation is transmitted as an input of an HARQ buffer controller 845, and the HARQ buffer controller operates the HARQ buffer operation based on the information.

In an HARQ buffer block 815, an LLR compression unit 830, an LLR decompression unit 820, and an HARQ buffer 825 are included. The HARQ buffer block determines whether to perform compression of the LLR values in accordance with the size of the data packet or a usage rate of a storage space of the HARQ buffer and the remaining HARQ buffer space. An LLR combining block 835 combines the LLR value of the received data packet and the LLR value stored in the HARQ buffer with each other, and it transmit the resultant value as an input of a decoder 840. The output of the decoder is finally input to a transport block CRC block 850, and the transport block CRC block transmits the result of the CRC check of the corresponding data packet to an HARQ feedback generator 855, and the HARQ feedback generator generates HARQ feedback information based on the result of the CRC check and the decoding result of the decoder.

In the disclosure, a transmission type is selected in consideration of the decoder performance of the receiver and the usage rate of the HARQ buffer storage space, and for this, the decoder transmits the resultant value of the decoding for the code blocks and the number of error occurrences for the code blocks to the HARQ buffer controller, and the transport block CRC block transmits the resultant value of the CRC check for the data packet as an input of the HARQ buffer controller. Accordingly, the HARQ buffer controller performs an HARQ buffer operation (i.e., data read and write) and/or a decompression function using the HARQ related information transmitted on the control channel, the resultant value of the CRC check of the corresponding data packet, and the resultant value of the decoding.

The HARQ feedback generator generates the feedback information in accordance with whether the LLR storage of the received data packet is possible, error degree distribution of code blocks, and early stopping criterion satisfaction distribution (the number of code blocks satisfying the early stopping condition) information, and it feeds back the feedback information to the transmitter, so that the HARQ feedback generator makes it possible to select the encoding method when requesting the retransmission to the transmitter in the unit of a data packet or code blocks of which the error has occurred. The encoding selection method of the transmitter uses an HARQ quality indicator value included in the HARQ feedback information. For example, according to the transmission encoding selection method, the feedback information may indicate a self-decodable code (in this case, the transmission encoding method may be the CC or the partial IR) or a non-self-decodable code (in this case, the transmission encoding method may be the full IR), or the transmission encoding selection method may be a method for directly indicating the HARQ type (CC, partial IR, or full IR). Further, the HARQ quality indicator may notify the transmitter of whether a specific data packet is stored in the HARQ buffer and the LLR quality (good or bad) status of the stored data packet.

Figure 9:
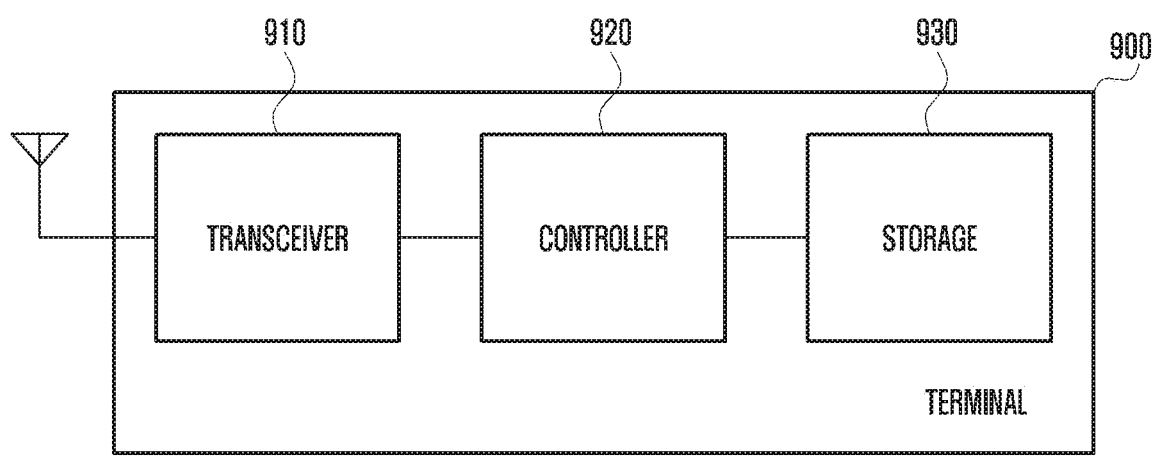
FIG. 9 is a diagram illustrating a receiver (or terminal) capable of embodying the disclosure.
Figure 10:
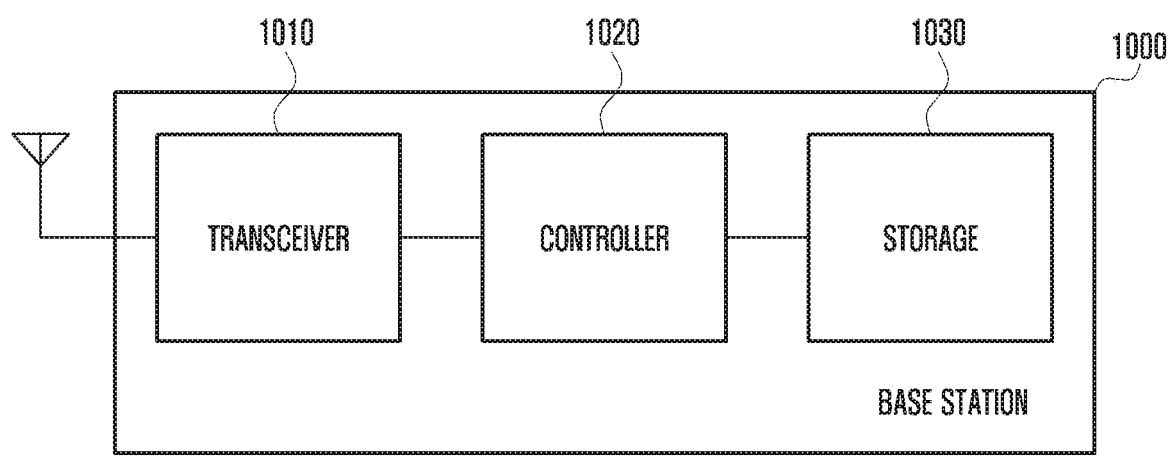
FIG. 10 is a diagram illustrating a transmitter (or base station) capable of embodying the disclosure.

Further, a device capable of embodying the disclosure may be configured as illustrated in FIGS. 9 and 10.

FIG. 9 is a diagram illustrating a receiver (or terminal) capable of embodying the disclosure. With reference to FIG. 9, a receiver may be composed of a transceiver 910, a controller 920, and a storage 930. The controller controls the transceiver and the storage to embody an embodiment of the disclosure. Specifically, the controller may control the transceiver to receive an initially transmitted data packet and a retransmitted data packet, and to receive HARQ related information, generate HARQ feedback information based on the received data packet and the HARQ related information, decode the data packet, and control the transceiver to transmit the generated HARQ feedback information to a transmitter. The transceiver may transmit and receive a signal to and from the transmitter, and the storage may store HARQ related information and LLR values of the data packet.

FIG. 10 is a diagram illustrating a transmitter (or base station) capable of embodying the disclosure. With reference to FIG. 10, a transmitter may be composed of a transceiver 1010, a controller 1020, and a storage 1030. The controller controls the transceiver and the storage to embody an embodiment of the disclosure. Specifically, the controller may control the transceiver to receive HARQ related information, generate a data packet to be transmitted based on the HARQ feedback information, and control the transceiver to transmit the generated data packet. The transceiver may transmit and receive a signal to and from a receiver, and the storage may store the HARQ feedback information.

In not only LTE but also all wired/wireless communication systems, a low-cost low-power receiver is very important, and in particular, it is greatly required to design a terminal (user equipment) or portable devices with low power consumption. According to the disclosure, even if an HARQ buffer having a limited capacity is used in all communication systems using the HARQ method, the throughput of the communication system can be improved and the error of the received data packet can be maximally reduced by transferring minimum feedback information required for the transmitter through real-time measurement and prediction of the HARQ buffer capacity of the receiver and the error correction capability status of the decoder. As a result, the transceiver using the disclosure can be operated at low cost and with low power consumption, and in particular, the size of the HARQ memory that is given much weight in the receiver can be reduced.

The invention claimed is:

1. A method by a transmitter for transmitting data, the method comprising:
   transmitting a first data packet to a receiver;
   receiving hybrid ARQ (HARQ) feedback information generated based on a decoding result of the first data packet;
   generating a second data packet based on the HARQ feedback information, wherein the second data packet corresponds to a retransmission of the first data packet; and
   transmitting the second data packet to the receiver,
   wherein the HARQ feedback information includes an acknowledgment (ACK) or a negative-acknowledgment (NACK) and information indicating an HARQ status of the first data packet, and
   wherein the information indicating the HARQ status of the first data packet is based on:
      whether a number of code blocks in which an error occurs is increased or decreased in accordance with an increase of a number of times of retransmission,
      a number of code blocks satisfying an early stopping criterion among code blocks included in the first data packet, wherein the early stopping criterion stops decoding of code blocks based on a possibility of decoding failure, and
      whether it is possible to store log-likelihood ratio (LLR) values in unit of code blocks or transmit blocks, of which the decoding has failed, in an HARQ buffer.

2. The method of claim 1, wherein the information indicating the HARQ status of the first data packet indicates that the second data packet is self-decodable or non-self-decodable.

3. The method of claim 1, wherein the information indicating the HARQ status of the first data packet indicates at least one of a status of an HARQ buffer storing the first data packet or a decoding status.

4. A method by a receiver for receiving data, the method comprising:
   receiving a first data packet from a transmitter;
   generating hybrid ARQ (HARQ) feedback information based on a decoding result of the first data packet;
   transmitting the HARQ feedback information to the transmitter; and
   receiving a second data packet generated based on the HARQ feedback information from the transmitter,
   wherein the second data packet corresponds to a retransmission of the first data packet,
   wherein the HARQ feedback information includes an acknowledgment (ACK) or a negative-acknowledgment (NACK) and information indicating an HARQ status of the first data packet, and
   wherein the information indicating the HARQ status of the first data packet is based on:
      whether a number of code blocks in which an error occurs is increased or decreased in accordance with an increase of a number of times of retransmission,
      a number of code blocks satisfying an early stopping criterion among code blocks included in the first data packet, wherein the early stopping criterion stops decoding of code blocks based on a possibility of decoding failure, and
      whether it is possible to store log-likelihood ratio (LLR) values in unit of code blocks or transmit blocks, of which the decoding has failed, in an HARQ buffer.

5. The method of claim 4, wherein the information indicating the HARQ status of the first data packet indicates that the second data packet is self-decodable or non-self-decodable.

6. The method of claim 4, wherein the information indicating the HARQ status of the first data packet indicates at least one of a status of an HARQ buffer storing the first data packet or a decoding status.

7. A transmitter for transmitting data, the transmitter comprising:
   a transceiver configured to transmit and receive signals with a receiver; and
   a controller configured to:
      control the transceiver to transmit a first data packet to the receiver and to receive hybrid ARQ (HARQ) feedback information generated based on a decoding result of the first data packet,
      generate a second data packet based on the HARQ feedback information, wherein the second data packet corresponds to a retransmission of the first data packet, and
      control the transceiver to transmit the second data packet to the receiver,
   wherein the HARQ feedback information includes an acknowledgment (ACK) or a negative-acknowledgment (NACK) and information indicating an HARQ status of the first data packet, and
   wherein the information indicating the HARQ status of the first data packet is based on:
      whether a number of code blocks in which an error occurs is increased or decreased in accordance with an increase of a number of times of retransmission,
      a number of code blocks satisfying an early stopping criterion among code blocks included in the first data packet, wherein the early stopping criterion stops decoding of code blocks based on a possibility of decoding failure, and whether it is possible to store log-likelihood ratio (LLR) values in unit of code blocks or transmit blocks, of which the decoding has failed, in an HARQ buffer.

8. The transmitter of claim 7, wherein the information indicating the HARQ status of the first data packet indicates that the second data packet is self-decodable or non-self-decodable.

9. The transmitter of claim 7, wherein the information indicating the HARQ status of the first data packet indicates at least one of a status of an HARQ buffer storing the first data packet or a decoding status.

10. A receiver for receiving data, the receiver comprising:
a transceiver configured to transmit and receive signals with a transmitter; and
a controller configured to:
control the transceiver to receive a first data packet from the transmitter,
generate hybrid ARQ (HARQ) feedback information based on a decoding result of the first data packet, and
control the transceiver to transmit the HARQ feedback information to the transmitter and to receive a second data packet generated based on the HARQ feedback information from the transmitter,
wherein the second data packet corresponds to a retransmission of the first data packet,
wherein the HARQ feedback information includes an acknowledgment (ACK) or a negative-acknowledgment (NACK) and information indicating an HARQ status of the first data packet, and
wherein the information indicating the HARQ status of the first data packet is based on:
whether a number of code blocks in which an error occurs is increased or decreased in accordance with an increase of a number of times of retransmission,
a number of code blocks satisfying an early stopping criterion among code blocks included in the first data packet, wherein the early stopping criterion stops decoding of code blocks based on a possibility of decoding failure, and
whether it is possible to store log-likelihood ratio (LLR) values in unit of code blocks or transmit blocks, of which the decoding has failed, in an HARQ buffer.

11. The receiver of claim 10, wherein the information indicating the HARQ status of the first data packet indicates that the second data packet is self-decodable or non-self-decodable.

12. The receiver of claim 10, wherein the information indicating the HARQ status of the first data packet indicates at least one of a status of an HARQ buffer storing the first data packet or a decoding status.

* * * * *